United States Patent
Kaneko et al.

(10) Patent No.: US 12,447,827 B2
(45) Date of Patent: Oct. 21, 2025

(54) ELECTRIC VEHICLE CONTROL DEVICE, ELECTRIC VEHICLE CONTROL METHOD, AND ELECTRIC VEHICLE CONTROL SYSTEM

(71) Applicant: Hitachi Astemo, Ltd., Hitachinaka (JP)

(72) Inventors: Satoshi Kaneko, Hitachinaka (JP); Keisuke Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 186 days.

(21) Appl. No.: 17/791,149

(22) PCT Filed: Jan. 12, 2021

(86) PCT No.: PCT/JP2021/000628
§ 371 (c)(1),
(2) Date: Jul. 6, 2022

(87) PCT Pub. No.: WO2021/145301
PCT Pub. Date: Jul. 22, 2021

(65) Prior Publication Data
US 2023/0027431 A1    Jan. 26, 2023

(30) Foreign Application Priority Data
Jan. 14, 2020  (JP) .................. 2020-003570

(51) Int. Cl.
*B60L 7/18* (2006.01)
(52) U.S. Cl.
CPC ............ *B60L 7/18* (2013.01); *B60L 2240/12* (2013.01); *B60L 2240/24* (2013.01); *B60L 2250/26* (2013.01)

(58) Field of Classification Search
CPC .... B60L 7/18; B60L 2240/12; B60L 2240/24; B60L 2250/26; B60L 2220/42;
(Continued)

(56) References Cited

U.S. PATENT DOCUMENTS

2006/0055240 A1* 3/2006 Toyota ..................... B60K 6/40
                                                    303/152
2011/0239804 A1* 10/2011 Hase ...................... B60W 30/19
                                                    74/473.11
(Continued)

FOREIGN PATENT DOCUMENTS

| JP | 2015229405 A | * | 12/2015 |
| JP | 2017-24434 A |   | 2/2017 |
| JP | 2017-47746 A |   | 3/2017 |

OTHER PUBLICATIONS

English translation of JP-2015229405-A (Year: 2015).*
(Continued)

*Primary Examiner* — Ramya P Burgess
*Assistant Examiner* — Preston Jay Miller
(74) *Attorney, Agent, or Firm* — Crowell & Moring LLP

(57) ABSTRACT

An electric vehicle control device, an electric vehicle control method, and an electric vehicle control system according to one embodiment of the present invention are configured to: obtain, based on operation information on release of an accelerator pedal of a vehicle and turn information on a turn of the vehicle, change rate information on a temporal change amount of a regenerative braking force with respect to an operation amount of the accelerator pedal; and output a regenerative braking control command for applying the regenerative braking force to a wheel based on the change rate information.

7 Claims, 11 Drawing Sheets

(58) Field of Classification Search
CPC .. B60L 2240/461; B60L 7/26; B60L 15/2009; B60L 15/2036; B60L 2240/423; B60W 10/08; B60W 30/045; B60W 2050/0024; B60W 30/18127; B60W 2520/10; B60W 2540/10; B60W 2540/18; B60W 2710/083; B60W 2710/085; B60W 2720/26; Y02T 10/72
USPC ............................................................ 701/22
See application file for complete search history.

(56) References Cited

U.S. PATENT DOCUMENTS

| | | | |
|---|---|---|---|
| 2013/0226388 A1* | 8/2013 | Kikuchi | B60L 3/102 701/22 |
| 2017/0015204 A1* | 1/2017 | Oguri | B60L 50/16 |
| 2018/0056987 A1* | 3/2018 | Suzuki | B60W 40/1005 |
| 2021/0039504 A1* | 2/2021 | Umetsu | B60W 10/08 |
| 2021/0162869 A1* | 6/2021 | Nakamura | B60L 15/2045 |

OTHER PUBLICATIONS

Extended European Search Report issued in European Application No. 21740993.7 dated Jun. 5, 2023 (10 pages).
International Search Report (PCT/ISA/210) issued in PCT Application No. PCT/JP2021/00628 dated Mar. 30, 2021 with English translation (five (5) pages).
Japanese-language Written Opinion (PCT/ISA/237) issued in PCT Application No. PCT/JP2021/00628 dated Mar. 30, 2021 (six (6) pages).

* cited by examiner

ELECTRIC VEHICLE CONTROL DEVICE, ELECTRIC VEHICLE CONTROL METHOD, AND ELECTRIC VEHICLE CONTROL SYSTEM

TECHNICAL FIELD

The present invention relates to an electric vehicle control device, an electric vehicle control method, and an electric vehicle control system.

BACKGROUND ART

There has been known a technology which provides both of a function of an accelerator pedal and a function of a brake pedal to a single pedal, and executes one-pedal control of accelerating a vehicle when a driver presses the single pedal from a predetermined position of a stroke thereof and decelerating the vehicle when the driver releases the single pedal from the predetermined position.

In Patent Literature 1 there is disclosed a configuration of setting the predetermined position so that the predetermined position is shifted to a position closer toward a non-operation side of the accelerator pedal as a vehicle body speed decreases.

CITATION LIST

Patent Literature

PTL 1: JP 2017-47746 A

SUMMARY OF INVENTION

Technical Problem

However, in Patent Literature 1, the stroke amount of the accelerator pedal at which switching is executed between a driving force and a braking force is simply changed in response to the vehicle body speed, and no consideration is given to operability for the driver at the time when the vehicle turns.

One object of the present invention is to provide an electric vehicle control device, an electric vehicle control method, and an electric vehicle control system which are capable of increasing operability at the time when regenerative braking as a result of release of an accelerator pedal is executed during a turn of a vehicle.

Solution to Problem

An electric vehicle control device, an electric vehicle control method, and an electric vehicle control system according to one embodiment of the present invention are configured to: obtain, based on operation information on release of an accelerator pedal of a vehicle and turn information on a turn of the vehicle, change rate information on a temporal change amount of a regenerative braking force with respect to an operation amount of the accelerator pedal; and output a regenerative braking control command for applying the regenerative braking force to a wheel based on the change rate information.

According to the one embodiment of the present invention, it is possible to increase operability at the time when the regenerative braking as a result of release of the accelerator pedal is executed during the turn of the vehicle.

DESCRIPTION OF EMBODIMENTS

First Embodiment

Figure 1:
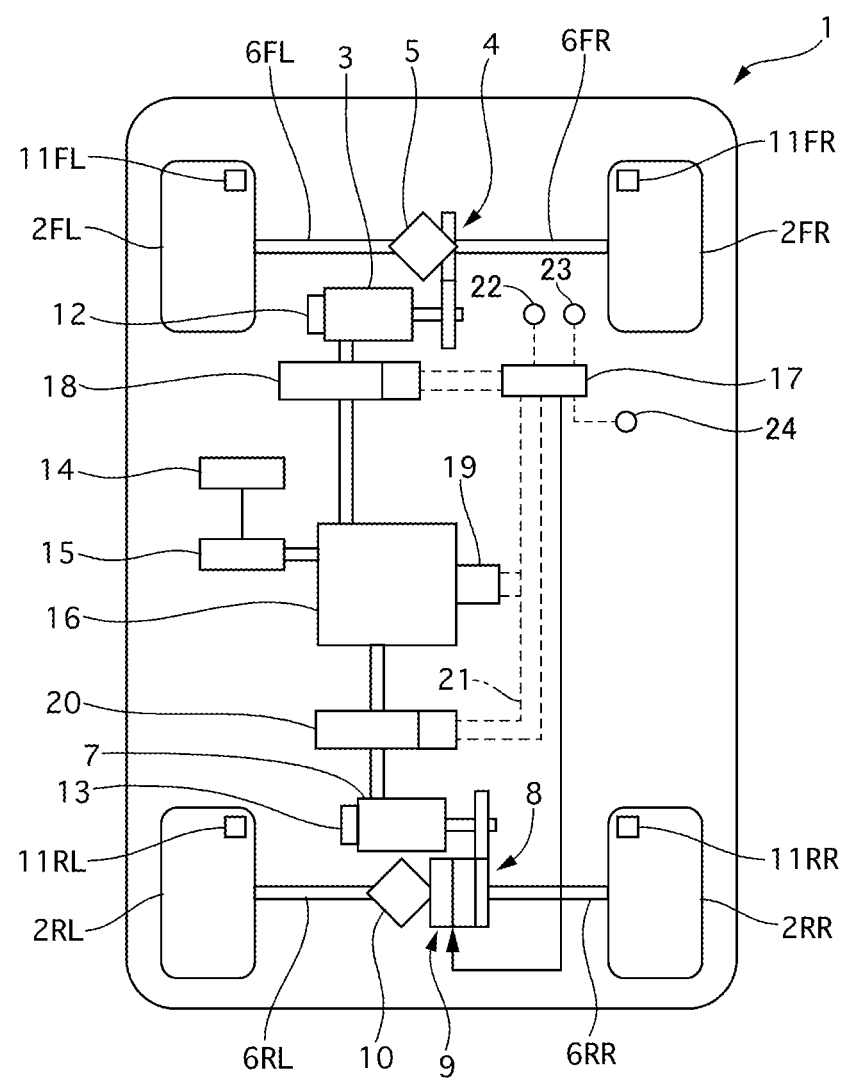
FIG. 1 is a configuration diagram of an electric vehicle control system according to a first embodiment of the present invention.

FIG. 1 is a configuration diagram of an electric vehicle control system according to a first embodiment of the present invention.

An electric vehicle 1 includes a front motor (electric motor for front wheels) 3 which outputs torques to front wheels 2FL and 2FR. A power transmission between the front motor 3 and the front wheels 2FL and 2FR is executed through a speed reducer 4, a differential 5, and front axles 6FL and 6FR.

The electric vehicle 1 includes a rear motor (electric motor for rear wheels) 7 which outputs torques to rear wheels 2RL and 2RR. The front wheels 2FL and 2FR and the rear wheels 2RL and 2RR are also generally referred to as "driving wheels 2." A power transmission between the rear motor 7 and the rear wheels 2RL and 2RR is executed through a speed reducer 8, a dog clutch 9, a differential 10, and rear axles 6RL and 6RR.

When the dog clutch 9 is engaged, the power is transmitted between the rear motor 7 and the rear wheels 2RL and 2RR.

Meanwhile, when the dog clutch 9 is disengaged, the power is not transmitted between the rear motor 7 and the rear wheels 2RL and 2RR.

The wheels 2FL, 2FR, 2RL, and 2RR include wheel speed sensors 11FL 11FR, 11RL, and 11RR which detect wheel speeds, respectively. The front motor 3 includes a front wheel resolver 12 which detects the motor rotation number. The rear motor 7 includes a rear wheel resolver 13 which detects the motor rotation number.

The electric vehicle 1 includes a low-voltage battery 14 and a high-voltage battery 15. The low-voltage battery 14 is, for example, a lead storage battery. The high-voltage battery 15 is, for example, a lithium ion battery or a nickel-hydrogen battery. The high-voltage battery 15 is charged by power boosted by a DC-DC converter 16.

The electric vehicle 1 includes a vehicle control device 17, a front motor control device 18, a rear motor control device 20, and a battery control device 19. The respective control devices 17, 18, 19, and 20 mutually share information through a CAN bus 21.

The vehicle control device 17 acquires information from various types of sensors such as the front wheel resolver 12, the rear wheel resolver 13, an accelerator pedal sensor 22 which detects an accelerator operation amount, a brake sensor 23 which detects a brake operation amount, and a gear position sensor 24, to thereby execute integrated control for the vehicle. The vehicle control device 17 calculates a front requested torque to be output by the front motor 3 and a rear requested torque to be output by the rear motor 7 based on a requested distribution torque for a requested torque based on the accelerator operation and the brake operation by a driver and the like.

The requested distribution torque is a requested value of a torque distribution ratio between the front wheels 2FL and 2FR and the rear wheels 2RL and 2RR, and is appropriately set based on a travel state. The front requested torque and the rear requested torque are also generally referred to as "driver requested torque."

The front motor control device 18 controls power to be supplied to the front motor 3 based on the front requested torque. The rear motor control device 20 controls power to be supplied to the rear motor 7 based on the rear requested torque.

The battery control device 19 monitors a charge/discharge state of the high-voltage battery 15 and unit cells forming the high-voltage battery 15. The battery control device 19 calculates a battery requested torque limit value based on the charge/discharge state of the high-voltage battery 15 and the like. The battery requested torque limit value is the maximum torque allowed in the front motor 3 and the rear motor 7. For example, when a charging amount of the high-voltage battery 15 is becoming smaller, the battery requested torque limit value is to be set to a smaller value than a normal value.

Figure 2:
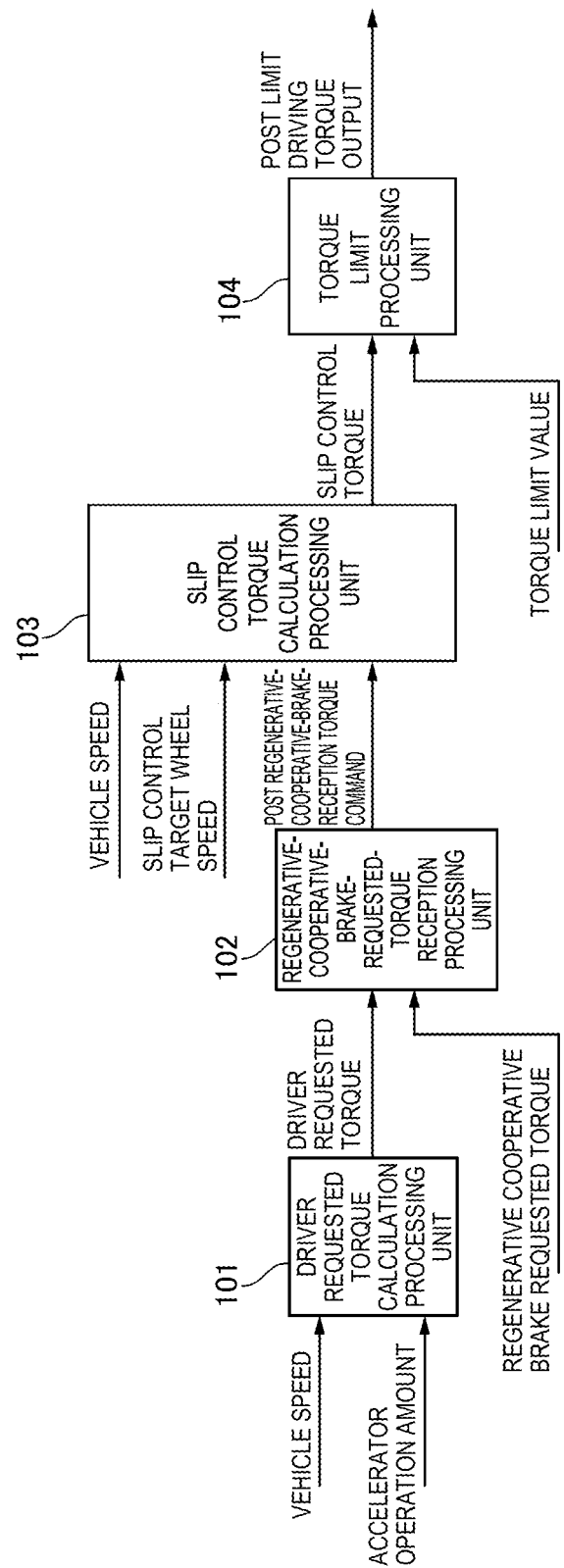
FIG. 2 is a control block diagram for illustrating driving torque calculation processing of a vehicle control device according to the first embodiment.

FIG. 2 is a control block diagram for illustrating driving torque calculation processing of the vehicle control device 17 according to the first embodiment.

A driver requested torque calculation processing unit 101 calculates a driver requested torque based on a vehicle speed and an accelerator operation amount. Details of the calculation executed in this processing unit are described later. As the vehicle speed, an estimated vehicle speed is calculated from rotation number information on the electric motor 3 or 7 acquired from the front wheel resolver 12 or the rear wheel resolver 13, but may be calculated from information from other sensors.

A regenerative-cooperative-brake-requested-torque reception processing unit 102 subtracts a regenerative cooperative brake requested torque component calculated based on the brake operation amount from the driver requested torque calculated by the driver requested torque calculation processing unit 101, to thereby calculate a post regenerative-cooperative-brake-reception torque.

A slip control torque calculation processing unit 103 calculates, from the vehicle speed and a slip control target wheel speed, a driving torque limit value during acceleration or a braking torque limit value during deceleration, and calculates a slip control torque limited so that the post regenerative-cooperative-brake-reception torque is within a range of the limit value.

A torque limit processing unit 104 uses various types of torque limit values such as the battery requested torque limit value to limit the slip control torque, and outputs a post limit driving torque as a command torque. The post limit driving torque includes both of a torque on the acceleration side of the vehicle and a torque on the deceleration side of the vehicle.

Figure 3:
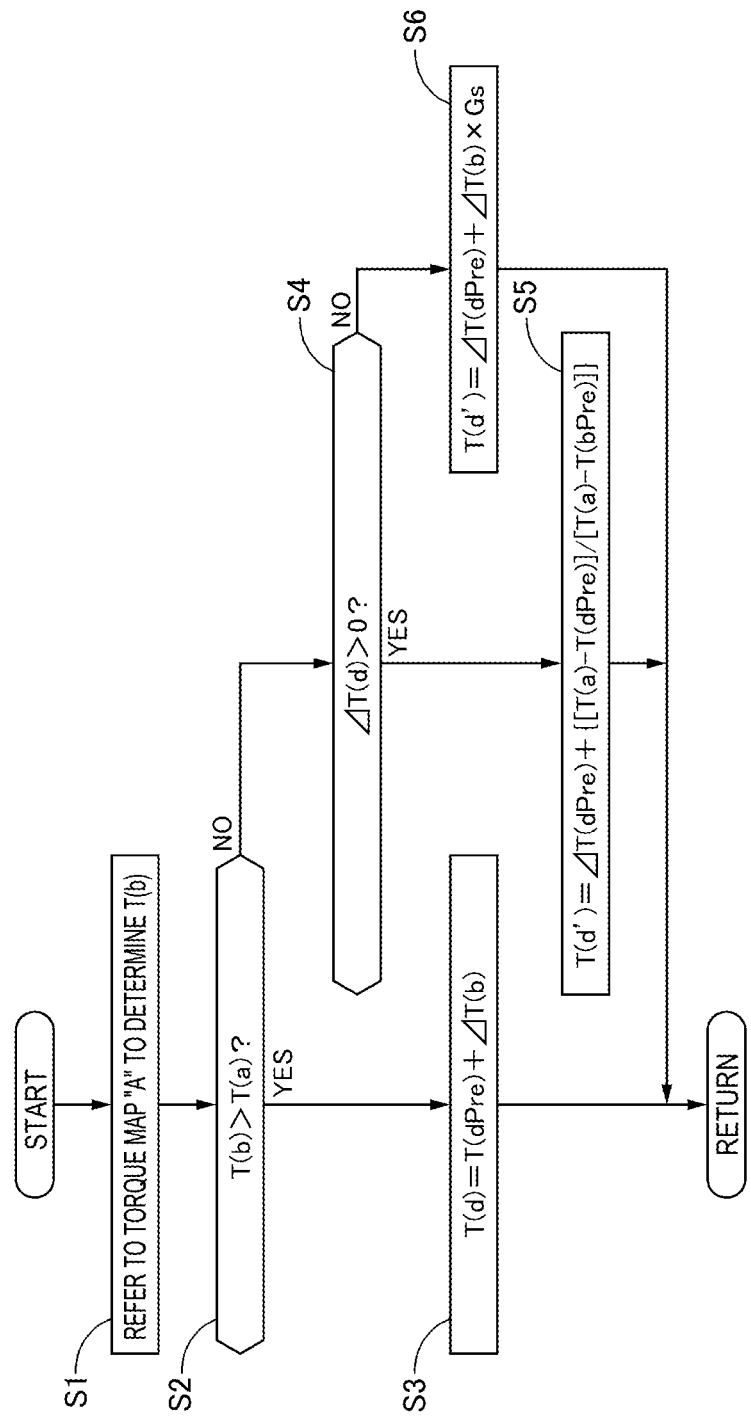
FIG. 3 is a flowchart for illustrating a base-torque-change-amount limit processing for driver requested torque calculation in the first embodiment.

FIG. 3 is a flowchart for illustrating a base-torque-change-amount limit processing for driver requested torque calculation in the first embodiment.

In Step S1, a base torque T (b) for each of the electric motors 3 and 7 being a reference of the one-pedal control is calculated from accelerator operation amount information on release of the accelerator pedal acquired from the accelerator pedal sensor 22 which detects a stroke of the accelerator pedal and the vehicle speed through use of a torque map A defined in advance. The base torque T(b) is uniquely determined from the vehicle speed and the stroke of the accelerator pedal, and is set as a torque which can decelerate the vehicle from a travel state to a stop state when the foot is completely released from the accelerator pedal on a flat road.

Figure 5:
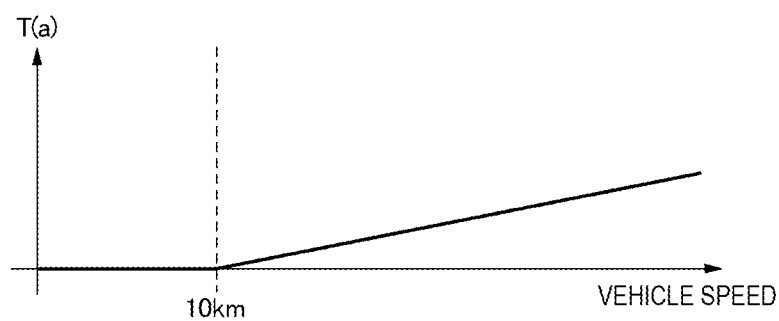
FIG. 5 is a graph for showing a torque map B to be used by the vehicle control device according to the first embodiment.

In Step S2, it is determined whether or not the base torque T(b) is higher than a torque determined through use of a torque map B. When the base toque T(b) is higher, the process proceeds to Step S3, and proceeds to Step S4 otherwise. FIG. 5 is a graph for showing the torque map B to be used by the vehicle control device according to the first embodiment. To the torque map B, a torque (hereinafter referred to as "acceleration start torque T(a)") at which the vehicle switches to accelerate is set. The acceleration start toque T(a) is a value set in advance from inertia and a rolling resistance of the vehicle and the like. However, when the vehicle speed increases, a travel resistance increases, and hence the accelerations start torque T(a) is calculated by adding a travel resistance increase amount indicated by the characteristic of FIG. 5 to the value set in advance.

In Step S3, when the base torque T(b) is higher than the acceleration start torque T(a), that is, when the vehicle is in an acceleration travel state, a value obtained by adding a base torque change amount $\Delta T(b)$ to a driver requested torque previous value T(dPre) is directly output as a driver requested torque T(d). The base torque change amount ΔT(b) is a difference between a base torque determined the current time (hereinafter referred to as "base torque current value T(bCur)") and a base torque determined the previous time (hereinafter referred to as "base torque previous value T(bPre)").

In Step S4, when the base torque T(b) is equal to or lower than the acceleration start torque T(a), that is, when the vehicle is in a constant speed travel state or a deceleration travel state, it is determined whether or not the base torque change amount ΔT(b) is larger than 0 (there is an acceleration travel intention). When the base torque change amount ΔT(b) is larger than 0, the process proceeds to Step S5. When the base torque change amount ΔT(b) is equal to or smaller than 0 (there is a constant speed travel intention or a deceleration travel intention), the process proceeds to Step S6.

In Step S5, the base torque change amount ΔT(b) is larger than 0, and hence this case is determined to be a case in which a driver presses the accelerator pedal more, and intends an acceleration travel. There is thus provided such control that the base torque T(b) and a post change-amount-limit driver requested torque T(d') match each other when the base torque T(b) reaches the acceleration start torque T(a). Specifically, the post change-amount-limit driver requested torque T(d') is calculated from the following relational expression (1).

$$T(d')=T(dPre)+\{(T(a)-T(dPre))/(T(a)-T(bPre))\} \quad [\text{Relational Expression (1)}]$$

In Step S6, the base torque change amount ΔT(b) is equal to or smaller than 0, and hence this case is determined to be a case in which the driver maintains the accelerator pedal or operates the accelerator pedal toward the foot release side, and intends a constant speed travel or a deceleration travel. The post change-amount-limit driver requested torque T(d') obtained by limiting the base torque change amount ΔT(b) is calculated from the following relational expression (2).

$$T(d')=T(dPre)+\Delta T(b) \times Gst \quad [\text{Relational Expression (2)}]$$

Figure 4:
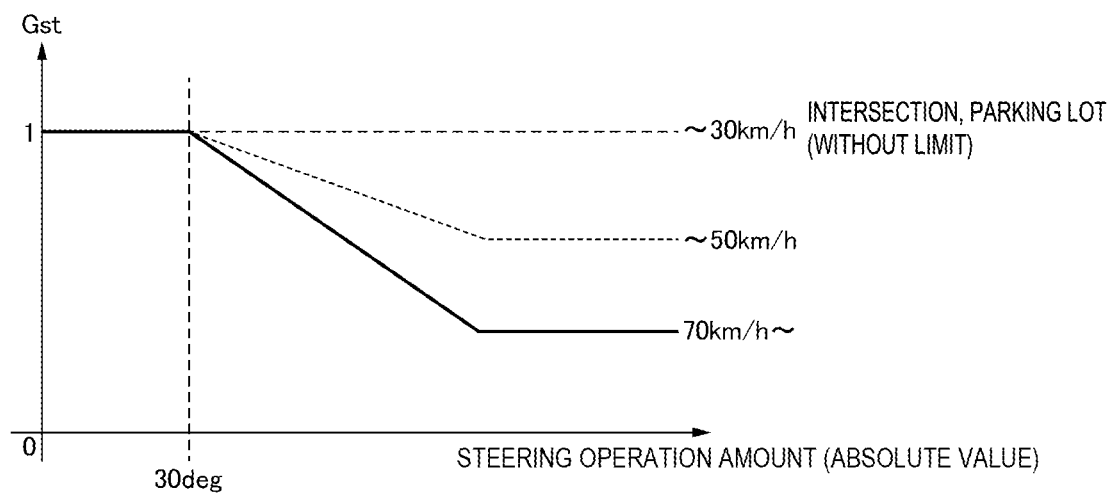
FIG. 4 is a graph for showing a gain map C to be used by the vehicle control device according to the first embodiment.

In this relational expression, Gst is a steering gain. FIG. 4 is a graph for showing a gain map C to be used by the vehicle control device according to the first embodiment. The gain map C is a gain characteristic graph in which a steering operation amount (which is an absolute value, and is also referred to as "steering angle") is assigned to a horizontal axis, and the torque change amount gain Gst is assigned to a vertical axis. To the gain map C, there is set such a characteristic that Gst decreases from 1 to a predetermined gain smaller than 1 when the steering operation amount becomes equal to or larger than 30 deg. In other words, when the steering operation amount is smaller than 30 deg, a large lateral force is not particularly required, and hence an unnecessary limit on a regenerative braking force is avoided. Moreover, to the gain map C, a plurality of gain characteristics each for each vehicle speed are set. When the vehicle speed is 30 km/h or lower, the steering operation is determined to be a steering operation inside an intersection or a parking lot, and hence it is not particularly required to consider a turn characteristic. Consequently, Gst remains 1. When the vehicle speed becomes higher, as the vehicle speed increases, and as the steering operation amount increases, Gst is set to decrease. When the steering operation amount is equal to or larger than a predetermined operation amount, Gst is set to be constant. As a result, when the driver executes the steering operation during the deceleration travel, an excessive limit on the change amount of the driver requested torque is avoided.

Figure 6B:
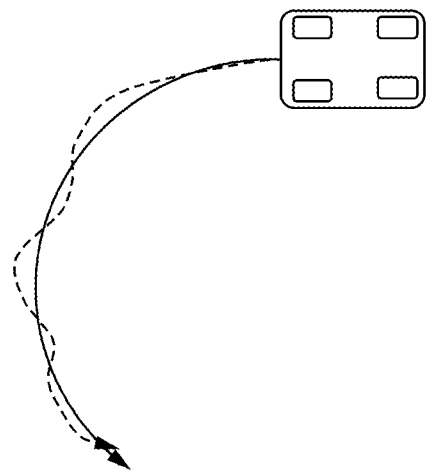
FIGS. 6A and 6B are a graph and a diagram for showing and illustrating, respectively, a turn state at the time when a driver operates an accelerator pedal toward a foot release side on a road surface having a certain constant road surface inclination (no road surface inclination), and turns the vehicle during a deceleration travel through one-pedal control.
Figure 6A:
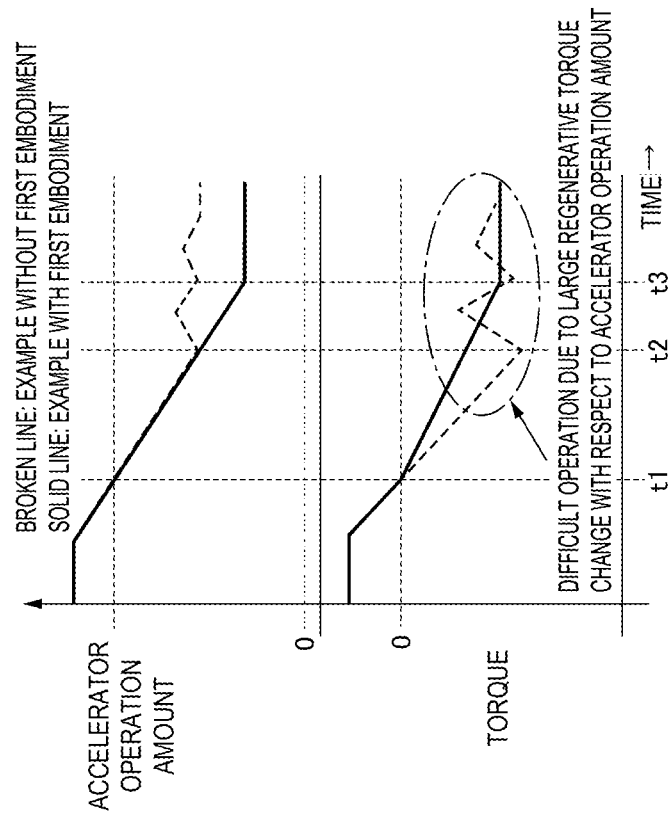

FIG. 6 are a graph and a diagram for showing and illustrating, respectively, a turn state at the time when the driver operates the accelerator pedal toward the foot release side on a road surface having a certain constant road surface inclination (no road surface inclination), and turns the vehicle during a deceleration travel through one-pedal control. FIG. 6(a) is a time chart for showing a relationship between the accelerator operation amount and a torque acting on driving wheels. Broken lines of FIG. 6(a) show an example in which the base-torque-change-amount limit processing in the first embodiment is not executed. Solid lines of FIG. 6(a) show an example in which the base-torque-change-amount limit processing in the first embodiment is executed. Moreover, the torque acting on the driving wheels and the driver requested torque substantially match each other, and hence there is shown a travel state in which limits other than the base-torque-change-amount limit processing and the like are not imposed. FIG. 6(b) is a schematic diagram for illustrating travel trajectories during the turn of the vehicle. A broken line of FIG. 6(b) indicates a travel trajectory in the case in which the base-torque-change-amount limit processing in the first embodiment is not executed. A solid line of FIG. 6(b) indicates a travel trajectory in the case in which the base-torque-change-amount limit processing in the first embodiment is executed.

As indicated by the broken lines of FIG. 6(a), when the accelerator pedal is operated from the state in which the accelerator operation is constant toward the foot release side, the torque acting on the driving wheels decreases in response to the accelerator operation amount, and a regenerative torque is thus generated. At this time, when a braking force component in a front-rear direction increases in a friction circle of the driving wheel, a lateral force component in a left-right direction decreases, and the vehicle presents an understeer tendency.

At a time t2, in order to avoid the understeer tendency, the driver slightly presses the accelerator pedal to reduce the regenerative torque, to thereby reduce the braking force component so that the lateral force is secured, and tries to return the trajectory to an ideal travel trajectory corresponding to the steering operation amount of the driver. Thus, as indicated by the broken lines of FIG. 6(a) and FIG. 6(b), it is required to execute complex operations of both of the pressing amount of the accelerator pedal and the steering operation amount to maintain the ideal travel trajectory, and it is difficult to achieve a stable turn travel state. Moreover, when a general vehicle which does not provide the one-pedal control is driven, and understeer during turn occurs, the accelerator pedal is generally operated toward the foot release side. That is, during the turn while the one-pedal control is being executed, an accelerator pedal operation opposite to that for driving a general vehicle is required, and there is a fear in that a load on the driver may increase.

Meanwhile, as indicated by the solid lines of FIG. 6(a), when the torque acting on the driving wheels falls below the acceleration start torque (0 in this example) at the time t1, in the case of the first embodiment indicated by the solid lines, the steering gain Gst is set to a value smaller than 1 due to the turn state of the vehicle, and the base torque change amount ΔT(b) is limited. Thus, a torque decrease amount is set as gradual, and the regenerative torque is suppressed. Consequently, in the friction circle of the driving wheel, the braking force component in the front-rear direction is suppressed, and the decrease in the lateral force component in the left-right direction can be suppressed. As a result, the understeer tendency of the vehicle can be avoided. Thus, as indicated by the solid lines of FIG. 6(a) and FIG. 6(b), the ideal travel trajectory can be maintained without the complex control of both of the releasing amount of the accelerator pedal and the steering operation amount, and a stable turn travel state can be achieved.

Figure 7:
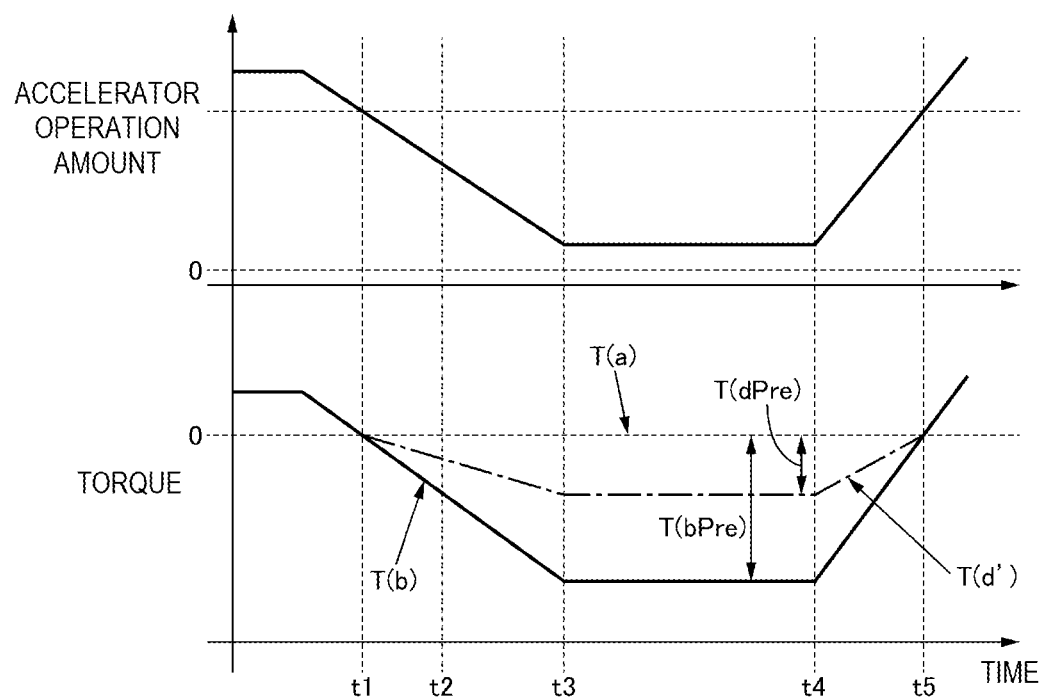
FIG. 7 is a time chart for showing control in a sequence of a deceleration travel, a constant speed travel, and an acceleration travel through the one-pedal control during a turn.

FIG. 7 is a time chart for showing control in a sequence of a deceleration travel, a constant speed travel, and an acceleration travel through the one-pedal control during a turn. Vertical axes indicate, from the top, the accelerator operation amount and the torque acting on the driving wheels. The vehicle speed is a predetermined vehicle speed higher than 30 km/h. An absolute value of the steering operation amount is 30 deg or more (that is, Gst is less than 1). A horizontal axes indicates the time. Times t1 to t3 of this time chart represent the same operation states as those at the same times of FIG. 6. However, a solid line of a row for the torque of FIG. 7 indicates the case in which the base-torque-change-amount limit processing in the first embodiment is not executed. A broken line thereof indicates the case in which the base-torque-change-amount limit processing in the first embodiment is executed.

When the base torque change amount is limited with respect to the operation of the accelerator pedal toward the foot release side (deceleration travel intention) during the turn, the base torque T(b) and the post change-amount-limit driver requested torque T(d') are apart from each other, and hence it is required to smoothly return the regenerative torque toward the base torque T(b) without the change amount limit when the regenerative torque is generated. Particularly when the regenerative torque continues as the post change-amount-limit driver requested torque T(d') under the state in which the base torque T(b) transitions from the deceleration travel state to the acceleration travel state, that is, the intention of the driver has switched to the acceleration intention, there is a fear in that the driver may feel a sense of discomfort. In view of this, when the driver presses the accelerator pedal at a time t4 of FIG. 7, and the accelerator operation amount indicates the acceleration travel intention, there is provided such control that the base torque T(b) and the post change-amount-limit driver requested torque T(d') match each other when the base torque T(b) reaches the acceleration start torque T(a) as described in Step S5. As a result, the base torque T(b) and the post change-amount-limit driver requested torque T(d') match each other by a transition of the vehicle from the deceleration travel state to the acceleration travel state, and the change amount limit is not imposed on the base torque T(b) after the transition to the acceleration travel state. Consequently, an increase in load on the driver can be prevented.

Figure 8:
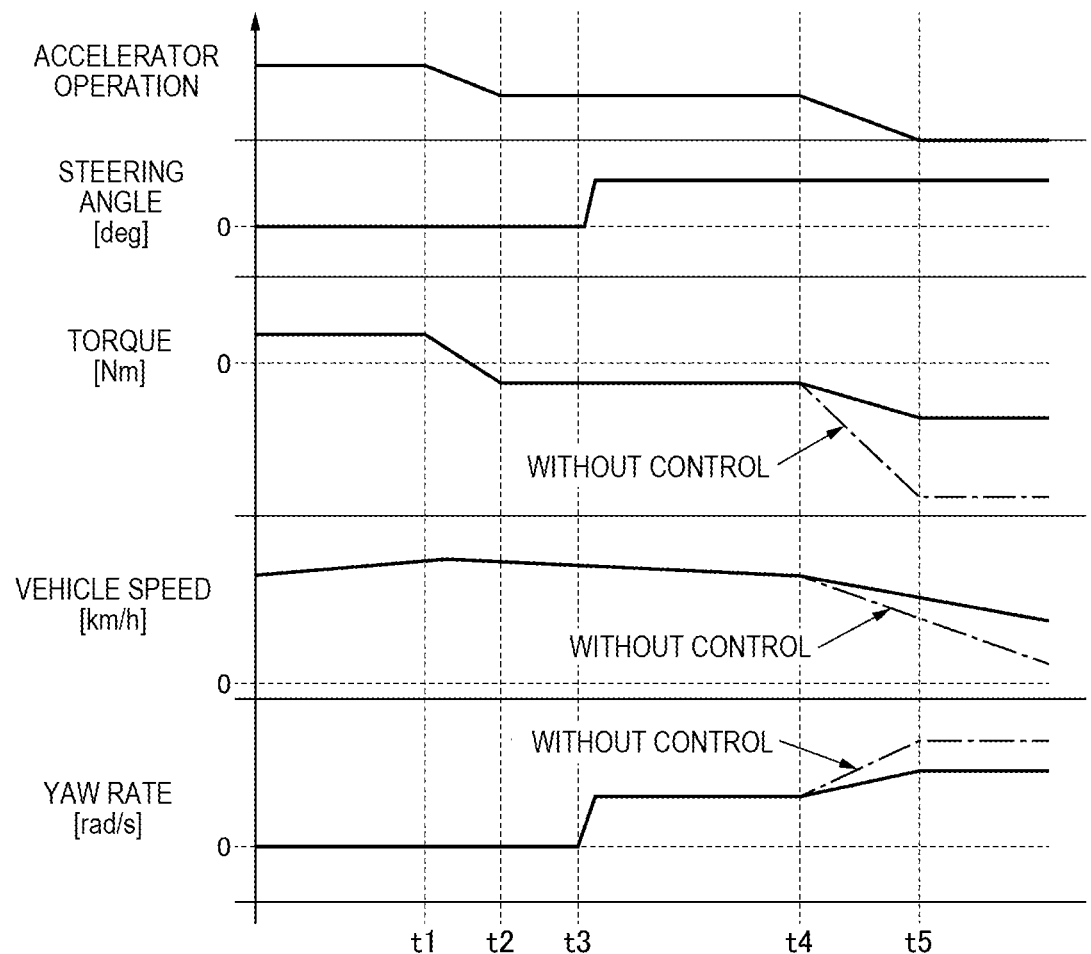
FIG. 8 is a time chart for showing a state in which the vehicle approaches a curve, and the driver operates the accelerator pedal toward the foot release side, and executes the steering operation during deceleration through the one-pedal control to pass the curve.

FIG. 8 is a time chart for showing a state in which the vehicle approaches a curve, and the driver operates the accelerator pedal toward the foot release side, and executes the steering operation during deceleration through the one-pedal control to pass the curve. Vertical axes indicate, from the top, the accelerator operation amount, the steering angle (steering operation amount), the torque acting on the driving wheels, the vehicle speed, and a yaw rate. A horizontal axis indicates the time. Solid lines of rows for the torque, the vehicle speed, and the yaw rate of FIG. 8 indicate the case in which the base-torque-change-amount limit processing in the first embodiment is executed. Broken lines thereof indicate the case in which the base-torque-change-amount limit processing in the first embodiment is not executed.

When the driver operates the accelerator pedal toward the foot release side in a straight and acceleration travel state at the time t1, the torque starts decreasing through the one-pedal control, the torque switches from the driving torque to the regenerative torque by the time t2, and the deceleration travel state is brought about.

At the time t3, the steering operation is executed, and a turn along a curve starts. At this time, while the accelerator operation amount is constant, the base torque T(b) also does not change, and is the same regenerative torque irrespective of whether or not the base-torque-change-amount limit processing is executed.

When the driver further operates the accelerator pedal toward the foot release side under the state in which the steering angle is constant at the time t4, the regenerative torque increases at once in the case in which the base-torque-change-amount limit processing is not executed, and the vehicle behavior becomes oversteer due to excessive generation of the yaw rate as the vehicle speed decreases. In this case, the driver cannot follow an intended turn trajectory, and thus repeats the steering operation and the accelerator pedal operation, to thereby return the turn trajectory to the intended trajectory. Thus, there is a fear in that the driving load may increase.

Meanwhile, when the base-torque-change-amount limit processing in the first embodiment is executed, the torque change amount with respect to the accelerator pedal operation amount during the turn is suppressed. Thus, the generation of an excessive yaw rate can be suppressed, and the accelerator pedal operation for following the intended turn trajectory thus becomes easy. Consequently, the driving load on the driver can be prevented from increasing.

Figure 9:
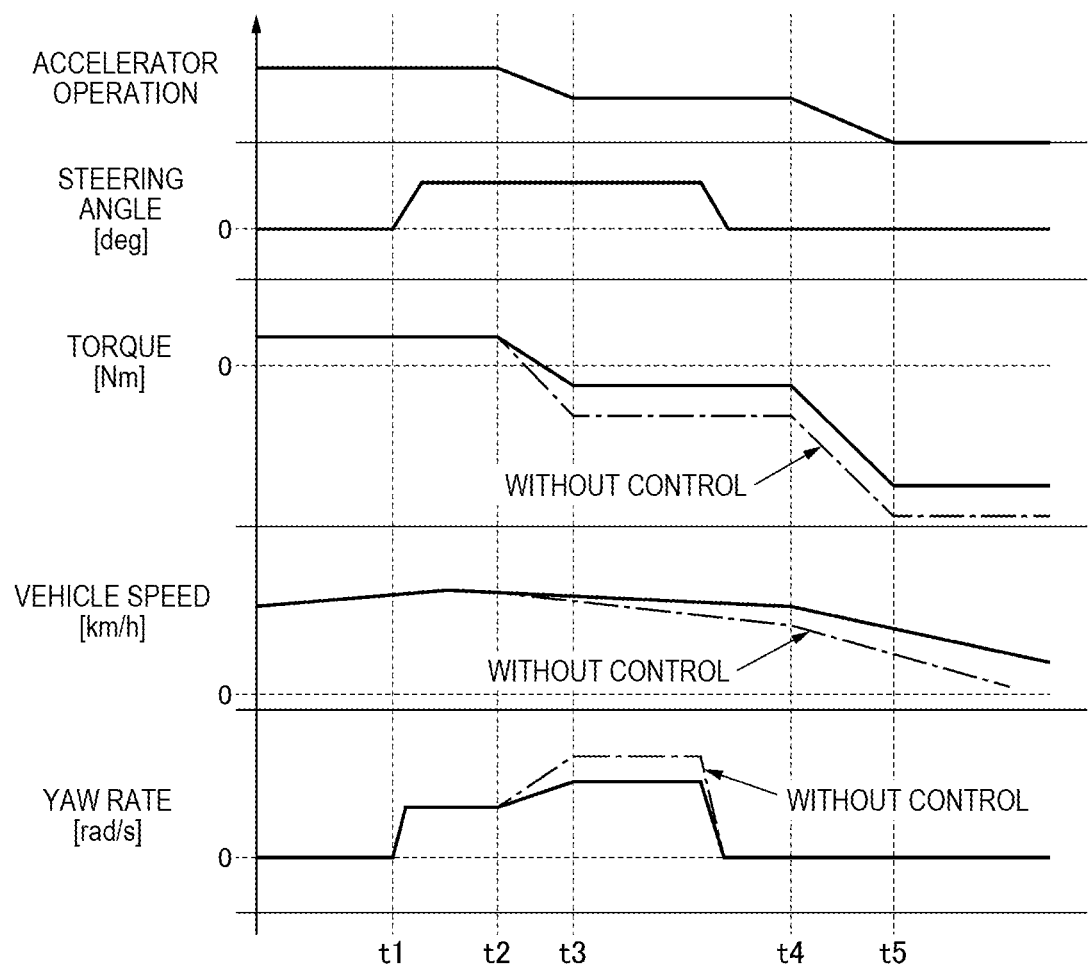
FIG. 9 is a time chart for showing a state in which the vehicle approaches a curve during acceleration, the driver starts the steering operation, and the vehicle decelerates through the one-pedal control during the steering operation and further decelerates after the passage of the curve.

FIG. 9 is a time chart for showing a state in which the vehicle approaches a curve during acceleration, the driver starts the steering operation, and the vehicle decelerates through the one-pedal control during the steering operation and further decelerates after the passage of the curve. Vertical axes indicate, from the top, the accelerator operation amount, the steering angle (steering operation amount), the torque acting on the driving wheels, the vehicle speed, and the yaw rate. A horizontal axis indicates the time. Solid lines of rows for the torque, the vehicle speed, and the yaw rate of FIG. 9 indicate the case in which the base-torque-change-amount limit processing in the first embodiment is executed. Broken lines thereof indicate the case in which the base-torque-change-amount limit processing in the first embodiment is not executed.

At the time t1 in the straight and acceleration travel state, the driver executes the steering operation to start a turn along a curve. At this time, while the accelerator operation amount is constant, the base torque T(b) also does not change, and is the same driving torque irrespective of whether or not the base-torque-change-amount limit processing is executed.

When the driver further operates the accelerator pedal toward the foot release side under the state in which the steering angle is constant at the time t2, the regenerative torque increases at once in the case in which the base-torque-change-amount limit processing is not executed, and the vehicle behavior becomes oversteer due to excessive generation of the yaw rate as the vehicle speed decreases. In this case, the driver cannot follow an intended turn trajectory, and thus repeats the steering operation and the accelerator pedal operation, to thereby return the turn trajectory to the intended trajectory. Thus, there is a fear in that the driving load may increase.

Meanwhile, when the base-torque-change-amount limit processing in the first embodiment is executed, the torque change amount with respect to the accelerator pedal operation amount during the turn is suppressed. Thus, the generation of an excessive yaw rate can be suppressed, and the accelerator pedal operation for following the intended turn trajectory becomes easier. Consequently, the driving load on the driver can be prevented from increasing.

When the driver maintains the accelerator pedal operation constant after the time t3, there continues a state in which a low deceleration compared with the case in which the base-torque-change-amount limit processing is not executed is generated. Under this state, even when the driver returns the steering angle to a neutral position and the vehicle transitions from the turn state to the straight travel state, the gradual deceleration state is maintained.

When the driver releases the foot from the accelerator pedal at the time t4, the steering angle is 30 degrees or less. Thus, the base-torque-change-amount limit processing is not executed, and the base torque is set in response to the accelerator pedal operation amount. However, the torque change amount is not limited, but as the torque absolute value, there acts a regenerative torque set to be small compared with that in the case in which the base-torque-change-amount limit processing is not executed. As a result, the vehicle stops after the gradual deceleration state.

Figure 10:
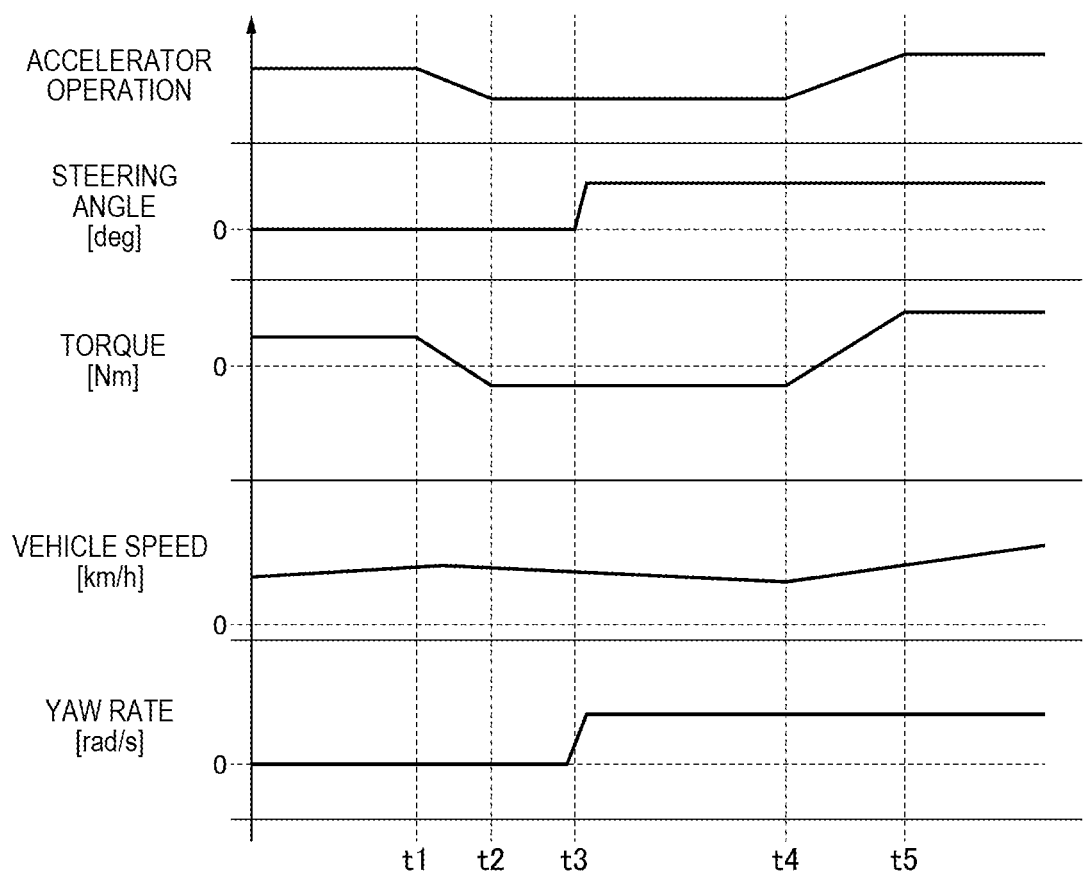
FIG. 10 is a time chart for showing a state in which the vehicle approaches a curve during acceleration, and after the driver starts deceleration through one-pedal control, the driver starts the steering operation, and then the vehicle accelerates.

FIG. 10 is a time chart for showing a state in which the vehicle approaches a curve during acceleration, and after the driver starts deceleration through one-pedal control, the driver starts the steering operation, and the vehicle then accelerates. Vertical axes indicate, from the top, the accelerator operation amount, the steering angle (steering operation amount), the torque acting on the driving wheels, the vehicle speed, and the yaw rate. A horizontal axis indicates the time. As shown in FIG. 10, even when the operation of releasing the accelerator pedal is executed before the steering operation, but the operation of releasing the accelerator pedal is not executed during the steering operation, the base-torque-change-amount limit processing is not executed. Thus, the same torque is applied to the vehicle which executes the base-torque-change-amount limit processing in the first embodiment and a vehicle which does not execute the base-torque-change-amount limit processing.

Figure 11:
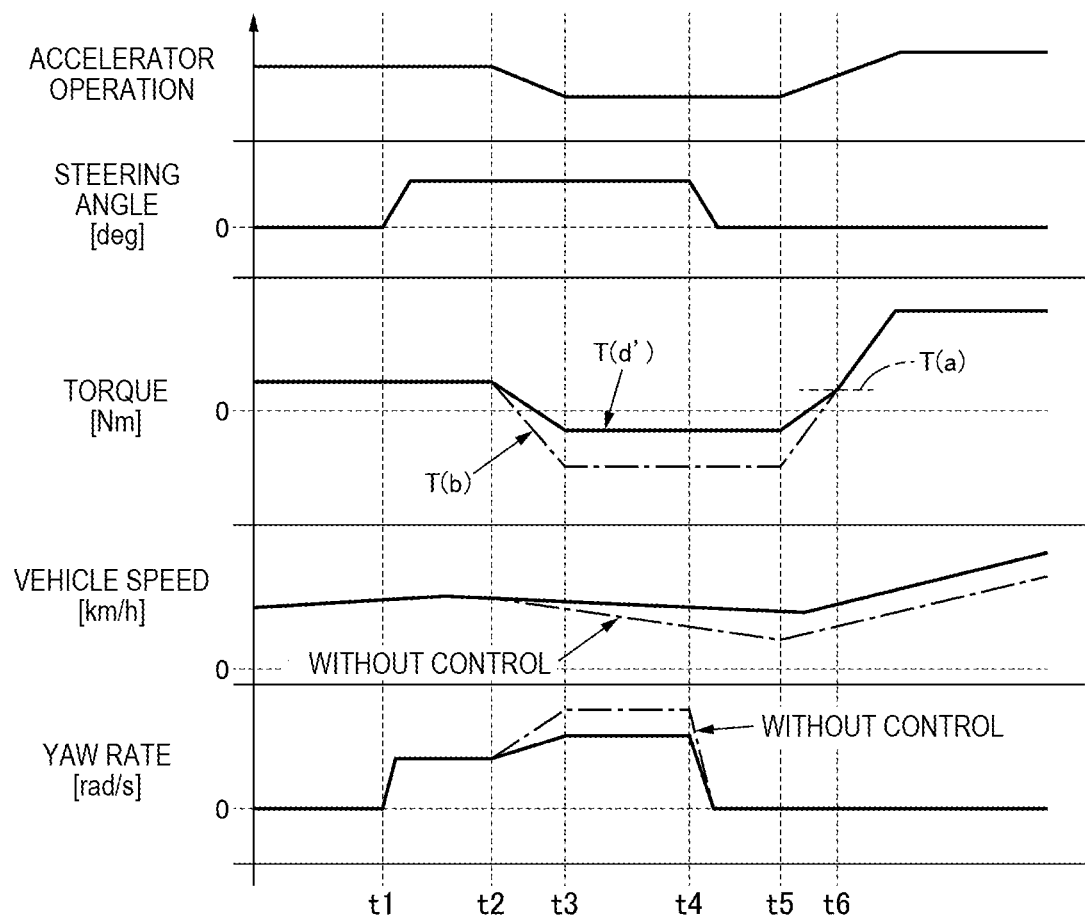
FIG. 11 is a time chart for showing a state in which the vehicle approaches a curve, and after the driver operates the accelerator pedal toward the foot release side and then executes the steering operation during deceleration through the one-pedal control to pass the curve, the vehicle accelerates in a straight travel state.

FIG. 11 is a time chart for showing a state in which the vehicle approaches a curve, and after the driver operates the accelerator pedal toward the foot release side and then executes the steering operation during deceleration through the one-pedal control to pass the curve, the vehicle accelerates in a straight travel state. Vertical axes indicate, from the top, the accelerator operation amount, the steering angle (steering operation amount), the torque acting on the driving wheels, the vehicle speed, and the yaw rate. A horizontal axis indicates the time. Solid lines of rows for the torque, the vehicle speed, and the yaw rate of FIG. 11 indicate the case in which the base-torque-change-amount limit processing in the first embodiment is executed. Broken lines thereof indicate the case in which the base-torque-change-amount limit processing in the first embodiment is not executed. An operation from the time t1 to the time t4 is the same as that from the time t1 to the time t4 of FIG. 8 described above, and hence description thereof is omitted.

When the base torque change amount is limited with respect to the operation of the accelerator pedal toward the foot release side (deceleration travel intention) during the turn after the time t2, the base torque T(b) and the post change-amount-limit driver requested torque T(d') are apart from each other, and hence it is required to smoothly return the regenerative torque toward the base torque T(b) without the change amount limit when the regenerative torque is generated. In particular, when the regenerative torque continues as the post change-amount-limit driver requested torque T(d') under the state in which the base torque T(b) transitions from the deceleration travel state to the acceleration travel state, that is, the intention of the driver has switched to the acceleration intention, there is a fear in that the driver may feel a sense of discomfort.

In view of this, when the driver presses the accelerator pedal at a time t5 of FIG. 11 after the turning is ended, and the accelerator operation amount indicates the acceleration travel intention, there is provided such control that the base torque T(b) and the post change-amount-limit driver requested torque T(d') match each other at a time t6, which is a time when the base torque T(b) reaches the acceleration start torque T(a), as described in Step S5. As a result, the base torque T(b) and the post change-amount-limit driver requested torque T(d') match each other by a transition of the vehicle from the deceleration travel state to the acceleration travel state, and the change amount limit is not imposed on the base torque T(b) after the transition to the acceleration travel state. Consequently, an increase in load on the driver can be prevented.

Figure 12:
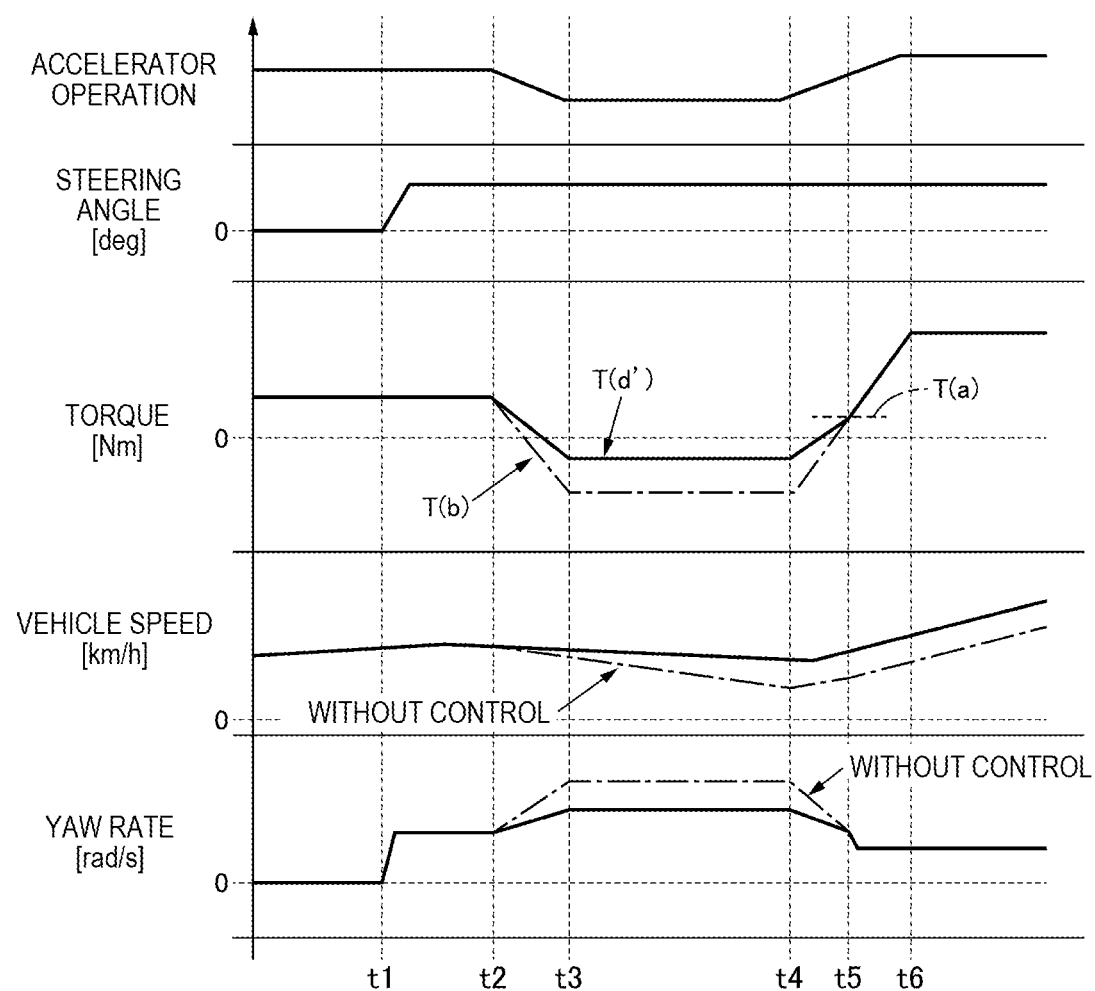
FIG. 12 is a time chart for showing a state in which the vehicle approaches a curve, and the driver operates the accelerator pedal toward the foot release side, and then the vehicle accelerates in a turn state while the driver is executing the steering operation during deceleration through the one-pedal control to pass the curve.

FIG. 12 is a time chart for showing a state in which the vehicle approaches a curve, and the driver operates the accelerator pedal toward the foot release side, and then the vehicle accelerates in a turn state while the driver is executing the steering operation during deceleration through the one-pedal control to pass the curve. Vertical axes indicate, from the top, the accelerator operation amount, the steering angle (steering operation amount), the torque acting on the driving wheels, the vehicle speed, and the yaw rate. A horizontal axis indicates the time. Solid lines of rows for the torque, the vehicle speed, and the yaw rate of FIG. 12 indicate the case in which the base-torque-change-amount limit processing in the first embodiment is executed. Broken lines thereof indicate the case in which the base-torque-change-amount limit processing in the first embodiment is not executed. An operation from the time t1 to the time t4 is the same as that from the time t1 to the time t4 of FIG. 11 described above, and hence description thereof is omitted.

When the base torque change amount is limited with respect to the operation of the accelerator pedal toward the foot release side (deceleration travel intention) during the turn after the time t2, the base torque T(b) and the post change-amount-limit driver requested torque T(d') are apart from each other, and hence it is required to smoothly return the regenerative torque toward the base torque T(b) without the change amount limit when the regenerative torque is generated. In particular, when the regenerative torque continues as the post change-amount-limit driver requested torque T(d') under the state in which the base torque T(b) transitions from the deceleration travel state to the acceleration travel state, that is, the intention of the driver has switched to the acceleration intention, there is a fear in that the driver may feel a sense of discomfort.

In view of this, when the driver presses the accelerator pedal during a turn at a time t5 of FIG. 12, and the accelerator operation amount indicates the acceleration travel intention, there is provided such control that the base torque T(b) and the post change-amount-limit driver requested torque T(d') match each other at a time t6, which is a time when the base torque T(b) reaches the acceleration start torque T(a), as described in Step S5. As a result, the base torque T(b) and the post change-amount-limit driver requested torque T(d') match each other by a transition of the vehicle from the deceleration travel state to the acceleration travel state, and the change amount limit is not imposed on the base torque T(b) after the transition to the acceleration travel state. Consequently, an increase in load on the driver can be prevented.

The electric vehicle control device, the electric vehicle control method, and the electric vehicle control system according to the first embodiment provide actions and effects listed below.

(1) An electric vehicle control device, including the front motor 3 and the rear motor 7 (hereinafter referred to as "electric motors") configured to apply the regenerative braking force to the wheels of the vehicle, the vehicle control device 17 configured to obtain the control command for controlling the electric motors, the front motor control device 18, and the rear motor control device 20 (hereinafter referred to as "controller"), wherein the controller is configured to:
acquire the accelerator operation amount (first operation information) relating to the release of the accelerator pedal of the vehicle;
acquire the steering operation amount being turn information on the turn of the vehicle;
obtain the base torque change amount ΔT(b) (first change rate information) relating to the temporal change amount of the regenerative braking force with respect to the operation amount of the accelerator pedal based on the accelerator operation amount and the steering operation amount; and
output the regenerative braking control command for applying the regenerative braking force to the wheels based on the base torque change amount ΔT(b).

Thus, the operability can be increased when the regenerative braking through the release of the accelerator pedal is executed during the turn of the vehicle. The steering operation amount is detected as the turn information, but the turn information may be acquired from, for example, a yaw rate sensor or deviations among the wheel speeds of the four wheels.

(2) The controller is configured to:
acquire a steering angle of the vehicle out of the turn information; and
obtain, when the steering angle exceeds, for example, 30 deg (predetermined steering angle), the base torque change amount ΔT(b) so that the temporal change amount of the regenerative braking force with respect to the operation amount of the accelerator pedal is smaller than the preset temporal change amount of the regenerative braking force with respect to the operation amount of the accelerator pedal.

Thus, the torque change amount can be limited in response to the turn state, and the operability can be increased more.

(3) The controller is configured to obtain the base torque change amount ΔT(b) so that the temporal change amount of the regenerative braking force with respect to the operation amount of the accelerator pedal decreases as the steering angle increases.

Thus, the change in the regenerative braking force is limited more as the steering angle increases, and hence the operability can be increased under the state in which the lateral force of the wheel is required more.

(4) The controller is configured to obtain, when the steering angle is 30 degrees or less, the base torque change amount ΔT(b) so that the preset temporal change amount of the regenerative braking force with respect to the operation amount of the accelerator pedal is maintained.

That is, when the steering operation amount is smaller than, for example, 30 deg, a large lateral force is not particularly required, and hence an unnecessary limit on the regenerative braking force can be avoided.

(5) The controller is configured to obtain, when the vehicle speed is, for example, 30 km/h or lower, the base torque change amount ΔT(b) so that the preset temporal change amount of the regenerative braking force with respect to the operation amount of the accelerator pedal is maintained.

That is, when the vehicle speed is, for example, 30 km/h or lower, the steering operation is determined to be a steering operation inside an intersection or a parking lot, and hence it is not particularly required to consider the turn characteristic. Consequently, an unnecessary limit on the temporal change amount of the regenerative braking force can be avoided.

(6) The controller is configured to obtain the base torque change amount ΔT(b) so that the preset temporal change amount of the regenerative braking force with respect to the operation amount of the accelerator pedal decreases as the speed of the vehicle increases.

That is, the lateral force during a turn is required to be secured more as the speed of the vehicle increases. Thus, the lateral force can be secured by decreasing the temporal change amount of the regenerative braking force, and the operability can be increased.

(7) When the controller acquires the accelerator operation amount relating to the release of the accelerator pedal, and then acquires the accelerator operation amount on the pressing of the accelerator pedal (second operation information), the controller is configured to:
obtain the post change-amount-limit driver requested torque T(d') (second change rate information) relating to the temporal change amount of the driving force with respect to the operation amount of the accelerator pedal so that the period of time until the vehicle transitions to acceleration is the same regardless of the turn information; and
output the driving force control command for applying the driving force to the wheel based on the post change-amount-limit driver requested torque T(d').

As a result, the base torque T(b) and the post change-amount-limit driver requested torque T(d') match each other by the transition of the vehicle from the deceleration travel state to the acceleration travel state, and the change amount limit is not imposed on the base torque T(b) after the transition to the acceleration travel state. Consequently, an increase in load on the driver can be prevented.

Other Embodiments

The embodiment of the present invention has been described above. However, the specific configuration of the present invention is not limited to the configuration described in the embodiment. A modification in design without departing from the scope of the gist of the invention is also encompassed in the present invention.

For example, in this embodiment, the speed of the vehicle is calculated from the rotation number information on the front wheel resolver 12 which detects the motor rotation number of the front motor 3 and the rear wheel resolver 13 which detects the motor rotation number of the rear motor 7, but the speed of the vehicle may be calculated from the wheel speed sensors 11.

(Technical Idea Understandable from Embodiment)

A description is now given of the technical idea (or technical solution; the same applies hereinafter) understandable from the embodiment described above.

(1) In one aspect of the technical idea, there is provided an electric vehicle control device, including a control unit configured to obtain a control command for controlling an electric motor which applies a regenerative braking force to a wheel of a vehicle, wherein the control unit is configured to:
acquire first operation information on release of an accelerator pedal of the vehicle;
acquire turn information on a turn of the vehicle;
obtain first change rate information on a temporal change amount of the regenerative braking force with respect to an operation amount of the accelerator pedal based on the first operation information and the turn information; and
output a regenerative braking control command for applying the regenerative braking force to the wheel based on the first change rate information.

(2) In a more preferred aspect, in the above-mentioned aspect, the control unit is configured to:
acquire a steering angle of the vehicle out of the turn information; and
obtain, when the steering angle exceeds a predetermined steering angle, the first change rate information so that the temporal change amount of the regenerative braking force with respect to the operation amount of the accelerator pedal is smaller than a preset temporal change amount of the regenerative braking force with respect to the operation amount of the accelerator pedal.

(3) In another preferred aspect, in any one of the above-mentioned aspects, the control unit is configured to obtain the first change rate information so that the temporal change amount of the regenerative braking force with respect to the operation amount of the accelerator pedal decreases as the steering angle increases.

(4) In still another preferred aspect, in any one of the above-mentioned aspects, the control unit is configured to obtain, when the steering angle is equal to or smaller than the predetermined steering angle, the first change rate information so that the preset temporal change amount of the regenerative braking force with respect to the operation amount of the accelerator pedal is maintained.

(5) In yet another preferred aspect, in any one of the above-mentioned aspects, the control unit is configured to obtain, when a speed of the vehicle is equal to or lower than the predetermined speed, the first change rate information so that the preset temporal change amount of the regenerative braking force with respect to the operation amount of the accelerator pedal is maintained.

(6) In yet another preferred aspect, in any one of the above-mentioned aspects, the control unit is configured to obtain the first change rate information so that the preset temporal change amount of the regenerative braking force with respect to the operation amount of the accelerator pedal decreases as the speed of the vehicle increases.

(7) In yet another preferred aspect, in any one of the above-mentioned aspects, when the control unit acquires the first operation information, and then acquires second operation information on pressing of the accelerator pedal, the control unit is configured to:
obtain second change rate information on a temporal change amount of a driving force with respect to the operation amount of the accelerator pedal so that a period of time until the vehicle transitions to acceleration is the same regardless of the turn information; and
output a driving force control command for applying a driving force to the wheel based on the second change rate information.

(8) Further, from another viewpoint, in one aspect of the technical idea, there is provided an electric vehicle control device, including a control unit configured to obtain a control command for controlling an electric motor which applies a regenerative braking force to a wheel of a vehicle, wherein, when an accelerator pedal is released by an occupant of the vehicle, the control unit is configured to output a regenerative braking control command so that a temporal change amount of the regenerative braking force with respect to an operation amount of the accelerator pedal is small in a case in which a steering operation is executed by the occupant of the vehicle compared with a case in which the steering operation is not executed by the occupant.

(9) Further, from still another viewpoint, in one aspect of the technical idea, there is provided an electric vehicle control method, including:
acquiring operation information on release of an accelerator pedal of the vehicle;
acquiring turn information on a turn of the vehicle;
obtaining change rate information on a temporal change amount of a regenerative braking force with respect to an operation amount of the accelerator pedal based on the operation information and the turn information; and
outputting a regenerative braking control command for applying the regenerative braking force to the wheel based on the change rate information.

(10) In yet another preferred aspect, in any one of the above-mentioned aspects, the electric vehicle control method further includes:
acquiring a steering angle of the vehicle out of the turn information; and
obtaining, when the steering angle exceeds a predetermined steering angle, the change rate information so that the temporal change amount of the regenerative braking force with respect to the operation amount of the accelerator pedal is smaller than a preset temporal change amount of the regenerative braking force with respect to the operation amount of the accelerator pedal.

(11) Further, from still another viewpoint, in one aspect of the technical idea, there is provided an electric vehicle control system, including:
an electric motor configured to apply a regenerative braking force to a wheel of a vehicle; and
a controller configured to obtain a control command for controlling the electric motor,
wherein the controller is configured to:
acquire operation information on release of an accelerator pedal of the vehicle;
acquire turn information on a turn of the vehicle;
obtain change rate information on a temporal change amount of the regenerative braking force with respect to an operation amount of the accelerator pedal based on the operation information and the turn information; and
output a regenerative braking control command for applying the regenerative braking force to the wheel based on the change rate information.

(12) In a more preferred aspect, in the above-mentioned aspect, the controller is configured to:
acquire a steering angle of the vehicle out of the turn information; and
obtain, when the steering angle exceeds a predetermined steering angle, the change rate information so that the temporal change amount of the regenerative braking force with respect to the operation amount of the accelerator pedal is smaller than a preset temporal change amount of the regenerative braking force with respect to the operation amount of the accelerator pedal.

Note that, the present invention is not limited to the above-mentioned embodiment, and includes further various modification examples. For example, in the above-mentioned embodiment, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, and replace a part of the configuration of each of the embodiments.

The present application claims a priority based on Japanese Patent Application No. 2020-003570 filed on Jan. 14, 2020. All disclosed contents including Specification, Scope of Claims, Drawings, and Abstract of Japanese Patent Application No. 2020-003570 filed on Jan. 14, 2020 are incorporated herein by reference in their entirety.

REFERENCE SIGNS LIST 1 electric vehicle, 3 front motor, 7 rear motor, 12 front wheel resolver, 13 rear wheel resolver, 17 vehicle control device, 18 front motor control device, 20 rear motor control device, 22 accelerator pedal sensor

The invention claimed is:

1. An electric vehicle control device, comprising a control unit configured to obtain a control command for controlling an electric motor which applies a regenerative braking force to a wheel of a vehicle,
wherein the control unit is configured to:
acquire first operation information indicating release of an accelerator pedal of the vehicle;
acquire steering angle of the vehicle;
obtain first change rate information on a temporal change amount of the regenerative braking force with respect to an operation amount of the accelerator pedal based on the first operation information and the steering angle so that when the steering angle exceeds a predetermined steering angle, the temporal change amount of the regenerative braking force with respect to the operation amount of the accelerator pedal is smaller than a preset temporal change amount of the regenerative braking force with respect to the operation amount of the accelerator pedal; and
output a regenerative braking control command for applying the regenerative braking force to the wheel based on the first change rate information; and
wherein when the control unit acquires the first operation information and the steering angle, and then acquires second operation information indicating pressing of the accelerator pedal, the control unit is configured to:
obtain a value of a driving force at which the vehicle switches to accelerate based on a speed of the vehicle,
obtain second change rate information on a temporal change amount of a driving force with respect to the operation amount of the accelerator pedal so that a period of time until a driving force reaches the value at which the vehicle switches to accelerate is the same regardless of the first change rate information that is based on the first operation information and the steering angle; and
output a driving force control command for applying a driving force to the wheel based on the second change rate information.

2. The electric vehicle control device according to claim 1, wherein the control unit is configured to obtain the first change rate information so that the temporal change amount of the regenerative braking force with respect to the operation amount of the accelerator pedal decreases as the steering angle increases.

3. The electric vehicle control device according to claim 1, wherein the control unit is configured to obtain, when the steering angle is equal to or smaller than the predetermined steering angle, the first change rate information so that the preset temporal change amount of the regenerative braking force with respect to the operation amount of the accelerator pedal is maintained.

4. The electric vehicle control device according to claim 1, wherein the control unit is configured to obtain, when the speed of the vehicle is equal to or lower than a predetermined speed, the first change rate information so that the preset temporal change amount of the regenerative braking force with respect to the operation amount of the accelerator pedal is maintained.

5. The electric vehicle control device according to claim 4, wherein the control unit is configured to obtain the first change rate information so that the preset temporal change amount of the regenerative braking force with respect to the operation amount of the accelerator pedal decreases as the speed of the vehicle increases.

6. An electric vehicle control method, comprising:
acquiring first operation information indicating release of an accelerator pedal of a vehicle;
acquiring a steering angle of the vehicle;
obtaining first change rate information on a temporal change amount of a regenerative braking force with respect to an operation amount of the accelerator pedal based on the first operation information and the steering angle so that when the steering angle exceeds a predetermined steering angle, the temporal change amount of the regenerative braking force with respect to the operation amount of the accelerator pedal is smaller than a preset temporal change amount of the regenerative braking force with respect to the operation amount of the accelerator pedal;
outputting a regenerative braking control command for applying the regenerative braking force to a wheel of the vehicle based on the first change rate information;
when the first operation information and the steering angle are is acquired, and then second operation information indicating pressing of the accelerator pedal is acquired, obtaining a value of a driving force at which the vehicle switches to accelerate based on a speed of the vehicle, and obtaining second change rate information on a temporal change amount of a driving force with respect to the operation amount of the accelerator pedal so that a period of time until a driving force reaches the value at which the vehicle switches to accelerate is the same regardless of the first change rate information that is based on the first operation information and the steering angle; and outputting a driving force control command for applying a driving force to the wheel based on the second change rate information.

7. An electric vehicle control system, comprising:
an electric motor configured to apply a regenerative braking force to a wheel of a vehicle; and
a controller configured to obtain a control command for controlling the electric motor,
wherein the controller is configured to:
   acquire first operation information indicating release of an accelerator pedal of the vehicle;
   acquire a steering angle of the vehicle;
   obtain first change rate information on a temporal change amount of the regenerative braking force with respect to an operation amount of the accelerator pedal based on the first operation information and the steering angle so that when the steering angle exceeds a predetermined steering angle, the temporal change amount of the regenerative braking force with respect to the operation amount of the accelerator pedal is smaller than a preset temporal change amount of the regenerative braking force with respect to the operation amount of the accelerator pedal; and
   output a regenerative braking control command for applying the regenerative braking force to the wheel based on the first change rate information; and
wherein when the controller acquires the first operation information and the steering angle, and then acquires second operation information indicating pressing of the accelerator pedal, the controller is configured to:
   obtain a value of a driving force at which the vehicle switches to accelerate based on a speed of the vehicle,
   obtain second change rate information on a temporal change amount of a driving force with respect to the operation amount of the accelerator pedal so that a period of time until a driving force reaches the value at which the vehicle switches to accelerate is the same regardless of the first change rate information that is based on the first operation information and the steering angle; and
   output a driving force control command for applying a driving force to the wheel based on the second change rate information.

* * * * *